United States Patent
Young

(10) Patent No.: US 6,860,296 B2
(45) Date of Patent: Mar. 1, 2005

(54) HIGH FLOW NOZZLE SYSTEM FOR FLOW CONTROL IN BLADDER SURGE TANKS

(76) Inventor: Winston B. Young, 132 W. Chestnut Ave., Monrovia, CA (US) 91016

(*) Notice: Subject to any disclaimer, the term of this patent is extended or adjusted under 35 U.S.C. 154(b) by 162 days.

(21) Appl. No.: 10/185,181

(22) Filed: Jun. 27, 2002

(65) Prior Publication Data
US 2003/0089410 A1 May 15, 2003

Related U.S. Application Data
(60) Provisional application No. 60/301,732, filed on Jun. 27, 2001.

(51) Int. Cl.[7] ............................................. F18L 55/04
(52) U.S. Cl. .......................................... 138/30; 138/42
(58) Field of Search .................................... 138/30, 42

(56) References Cited

U.S. PATENT DOCUMENTS

| | | | |
|---|---|---|---|
| 2,390,320 A | | 12/1945 | Overbeke |
| 2,448,118 A | * | 8/1948 | Pellettere ..................... 138/30 |
| 2,630,834 A | * | 3/1953 | Weber et al. ................. 138/30 |
| 3,003,522 A | | 10/1961 | Rohacs |
| 3,195,577 A | * | 7/1965 | Greer .......................... 138/30 |
| 3,333,604 A | * | 8/1967 | Birdwell ...................... 138/30 |
| 3,593,747 A | * | 7/1971 | Mercier ....................... 138/30 |
| 3,656,662 A | * | 4/1972 | Peterson .................. 222/386.5 |
| 3,948,288 A | * | 4/1976 | Mayer ......................... 138/30 |
| 4,103,492 A | * | 8/1978 | Sakazume .................... 60/588 |
| 4,166,478 A | * | 9/1979 | Sugimura et al. ............. 138/30 |
| 4,448,217 A | * | 5/1984 | Mercier ....................... 138/30 |
| 4,562,036 A | * | 12/1985 | Shin et al. .................. 376/283 |
| 4,610,369 A | * | 9/1986 | Mercier ....................... 220/721 |
| 4,638,838 A | * | 1/1987 | Richard et al. ............... 138/30 |
| 4,872,486 A | * | 10/1989 | Sugimura et al. ............. 138/30 |
| 5,036,879 A | * | 8/1991 | Ponci .......................... 137/496 |
| 5,388,720 A | * | 2/1995 | Murphy ....................... 220/581 |
| 2002/0134446 A1 | * | 9/2002 | Baltes ......................... 138/30 |

FOREIGN PATENT DOCUMENTS

| | | |
|---|---|---|
| DK | 196 24 545 | 8/1997 |
| NL | 259695 | 4/1964 |

* cited by examiner

Primary Examiner—James Hook
(74) Attorney, Agent, or Firm—Jeffer, Mangels, Butler & Marmaro LLP

(57) ABSTRACT

A bladder surge tank includes a liquid port, and a bladder disposed therein for providing a surge absorbing interface between liquid and pressurized gas within the tank. The bladder surge tank can be horizontally or vertically oriented. In a horizontal embodiment, the surge tank includes a nozzle system disposed horizontally therein that is separate from the liquid port and that is integrally joined to the interior wall. Such nozzle system includes a nozzle member positioned between the liquid port and the bladder, and comprises a plurality of perforations disposed therethrough. In a vertical embodiment, the surge tank includes a nozzle system disposed vertically therein that is part of the liquid port and that includes a nozzle member having a plurality of perforations disposed therethrough. In both embodiment, the perforations define a total area that is greater than a total area of the liquid port, and the perforations are distributed throughout the nozzle member such that liquid entering the tank body through the liquid port is dispersed uniformly into the tank body.

14 Claims, 6 Drawing Sheets

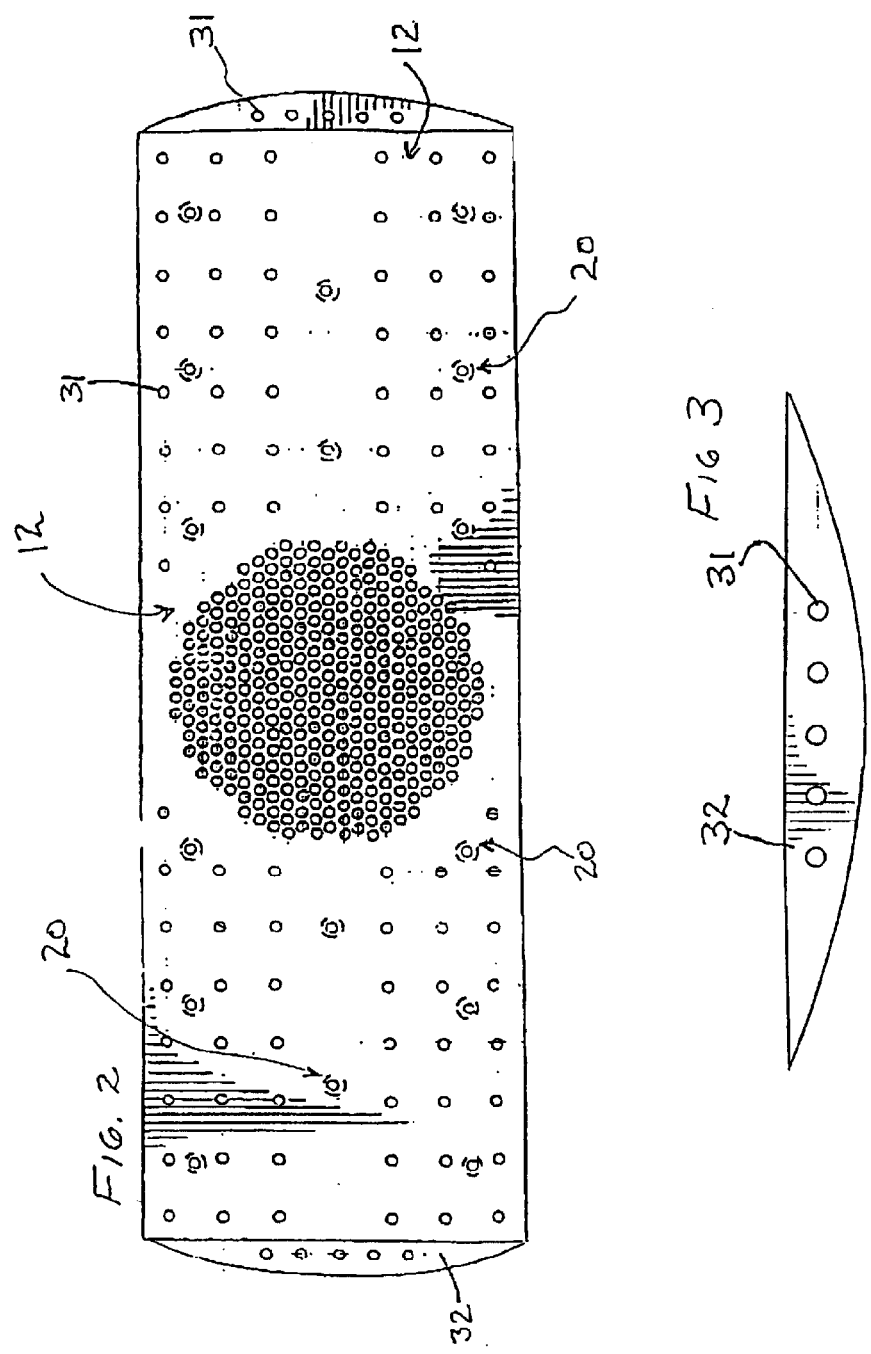

HIGH FLOW NOZZLE SYSTEM FOR FLOW CONTROL IN BLADDER SURGE TANKS

CROSS-REFERENCE TO RELATED APPLICATIONS

This application claims the benefit of U.S. Provisional application No. 60/301,732, filed on Jun. 27, 2001.

FIELD OF THE INVENTION

The present invention relates to a surge tanks, and more specifically, bladder surge tanks having a nozzle adapted to allow liquid to uniformly enter and exit the bladder surge tank.

BACKGROUND OF THE INVENTION

Surge tanks are designed to control pressure surges or transients in pipelines, which are created when the flow of the fluid is abruptly changed. Pressure transients can be either positive or negative and are potentially destructive and may result in damage to piping, pumps, instruments, fittings, or other system components.

Surge tanks have been used for years as a means for controlling pressure transients. Some surge tanks employ a bladder design and are well known having applications within various industries, including fire protection systems, municipal water and sewage systems, desalination facilities, fuel systems, and chemical and petrochemical facilities.

During a pump start up, for example, a high transient of pressure is created at the pump discharge. Installation of a bladder surge tank at the pump discharge absorbs the fluid from the pump until the fluid achieves steady state velocity, then the surge tank discharges the fluid into the system to balance the pressure and eliminate the pressure transient. Pressure transients may also be created where there is a sudden and abrupt cessation of liquid flow, hereto, bladder surge tanks can eliminate the pressure transient. Bladder surge tanks also have application as a deluge surge tank where the instantaneous discharge of fluid is required in, for example, fire protection systems.

Regardless of the application, the shape of the bladder during gas precharge or fluid discharge is not totally controllable. In systems where the flow rate exceeds 500 gpm, the bladder may actually seal the tank's fluid inlet/outlet opening during liquid discharge and prevent the tank from emptying its liquid contents. To prevent this, some bladder surge tank manufacturers have placed a wire screen in the tank's inlet/outlet opening. Unfortunately, such a screen actually impedes the liquid flow and is not totally effective in preventing the bladder from blocking the tank's fluid inlet/outlet opening during fluid discharge.

Where there is a sudden flow of fluid into a bladder surge tank, the force of the incoming fluid is concentrated and assumes the shape of the tank's fluid inlet/outlet opening. Such a column of fluid and its associated force is directed towards that portion of the bladder directly above the tank's inlet/outlet opening and can cause damage to the bladder.

There remains a need for a bladder surge tank that eliminates the likelihood of having the bladder block the tank's inlet/outlet opening during fluid discharge and thus interfere with the flow of fluid out of the bladder surge tank. There also remains a need for a bladder surge tank which can redirect the fluid entering the bladder surge tank in a more uniform pattern, thus reducing the possibility of bladder damage from the force of the incoming fluid.

SUMMARY OF THE INVENTION

High flow nozzle systems of this invention are provided for use with bladder surge tanks for the purpose of overcoming the aforementioned bladder blockage and bladder damage problem in the prior art bladder surge tanks. The nozzle systems of this invention comprise a uniquely designed nozzle member that is configured to cover the surge tank's fluid inlet/outlet opening. The nozzle member is designed to allow fluid to quickly and uniformly enter and exit the tank while at the same time reducing or eliminating the possibility of having the bladder block the tank's inlet/outlet fluid opening during fluid discharge.

The inventive nozzle member is provided in the form of a diffusor having multiple perforations, which act to disperse the fluid as it enters the tank, thereby redirecting the force of the incoming fluid and reducing damage to the bladder. Two embodiments of this inventive nozzle system include a horizontal nozzle member for use in a horizontal bladder surge tank, and a vertical nozzle member for use in a vertical bladder surge tank. The nozzle member can be integral with the tank's fluid inlet/outlet port, i.e., be provided as part of the inlet/outlet port itself, or can be non-integral with the inlet/outlet port, i.e., be separate from the inlet/outlet port.

In the case of applications within both the vertical and horizontal surge tanks, the inventive nozzle member is located between the tank's bladder and the tank's fluid inlet/outlet opening. The nozzle member has numerous perforations or openings therethrough that are arranged in a unique pattern. The perforation design also allows fluid to rapidly and uniformly enter or exit the surge tank, thereby eliminating unwanted pressure transients. The location, size, pattern, and number of openings through the nozzle member are mathematically determined to greatly reduce, if not eliminate altogether, the possibility of having the bladder collapse and block the tank's inlet/outlet opening before all of the fluid has been discharged. The openings also operate to disperse and redirect the flow of fluid entering the bladder surge tank, such that the force exerted by the incoming fluid is not directed towards a single portion of the bladder.

High flow nozzle systems of this invention are suitable for use in bladder tanks used in virtually every industry, including waste water and sewage systems, fuel-loading systems, petrochemical and chemical systems, desalination, and fire protection systems. Horizontal and vertical bladder surge tanks, fabricated with the nozzle system of this invention, provide a means for redirecting and more uniformly distributing the fluid entering the tank, thereby reducing the possibility of damage to the bladder caused by the force of the fluid during a sudden inflow. Further, upon a sudden dispensement of fluid from the tank, the inventive nozzle system virtually eliminates the possibility of having the bladder block the tank's inlet/outlet opening before all of the fluid has been discharged.

BRIEF DESCRIPTION OF THE DRAWINGS

These and other features and advantages of the present invention will be better understood by reference to the following detailed description when considered in conjunction with the accompanying drawings wherein:

FIG. 2 is a top perspective view of a nozzle member taken from the nozzle system of FIG. 1;

FIG. 3 is a side view of the horizontal nozzle member end tab of FIG. 2;

4A—as the tank is being filled with liquid; and FIG. 4B—when the tank is full of liquid);

DETAILED DESCRIPTION

In accordance with the present invention, there is provided improved bladder surge tanks comprising high flow nozzle systems suitable for use in various systems such as fire protection systems, waste water and sewage systems, fuel loading systems, desalination systems, and chemical and petro-chemical facilities. In particular, bladder surge tanks comprising high flow nozzle systems of this invention have specific application as deluge tanks, where the immediate discharge of liquid is required, in for example fire retardation.

Figure 1:
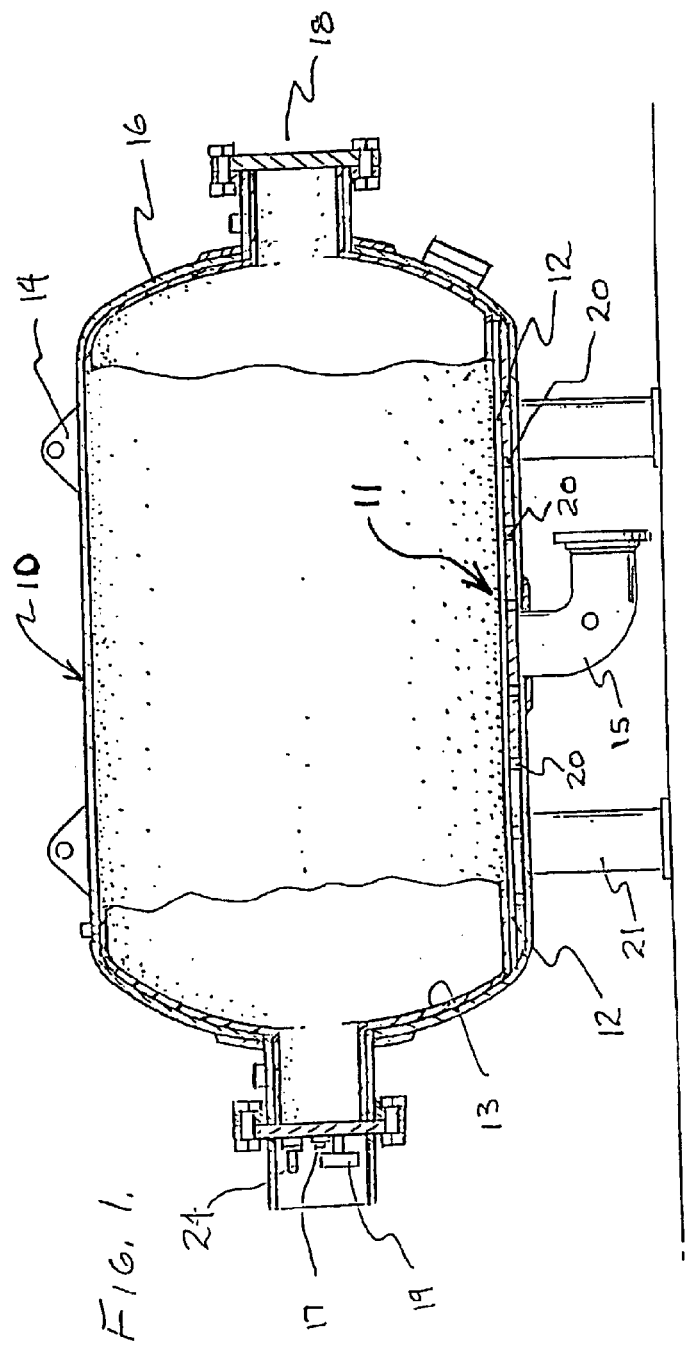
FIG. 1 is a cross-sectional side elevation of a horizontal surge tank comprising a high flow nozzle system of this invention.

FIG. 1 illustrates a horizontal bladder surge tank 10 comprising a high flow nozzle system 11 of this invention. The horizontal bladder surge tank 10 is a pressure vessel which contains a bladder 13, a liquid port or a fluid inlet/outlet port 15, and a nozzle system 11 positioned within the tank adjacent a terminal end of the inlet/outlet port 15. The horizontal bladder surge tank 10 comprises a body 16 having a bladder access opening 18 disposed therethrough at one end of the tank 10. Opposite the bladder access opening 18 is a gas charging valve 24, a rupture disc 17, and a pressure gauge 19. Other components of the surge tank may be added or deleted depending upon need.

Horizontal surge tanks can vary in size from about 250 gallons to more than 5,000 gallons or more. Surge tanks used with high flow nozzle systems of this invention may be constructed from a variety of materials, so long as the material has sufficient strength to support the load and operating pressures and is chemically resistant to the fluid being pumped. In the preferred embodiment, the material of construction is epoxy-coated carbon steel or stainless steel.

The horizontal bladder surge tank 10 is shown supported by two saddles 21. It is understood that the horizontal surge tank 10 may also be supported by legs. The bladder surge tank 10 may also be fitted with lift tabs 14, which allows the tank to be suspended and placed at the desired location with ease.

The bladder 13 is located within and adjacent to an interior wall of the surge tank body 16 and nozzle system 11. The bladder 13 may be constructed from a variety of materials which are suitable to contain gas under pressure as well as being resistant to attack from the liquid within the system. The bladder 13 must also be strong enough to withstand the pressure or force exerted upon it by the incoming fluid. In the preferred embodiment, the bladder 13 is made of a synthetic nitrile rubber, such as buna-n.

The tank's liquid inlet/outlet opening 15 is located at the base of tank 11 and allows fluid to enter and exit the tank 10. The dimensions of fluid inlet/outlet 15 opening may vary depending upon system needs.

The high flow nozzle system 11 of this invention includes a nozzle member 12 that is positioned adjacent a terminal end of the inlet/outlet port 15 within the tank. The nozzle member 12 is generally rectangular in shape, and is generally flat with rounded ends. In this particular embodiment, configured for placement within a horizontal surge tank, the nozzle member 12 is nonintegral and provided as a system element that is separate from the inlet/outlet port.

The nozzle member 12 is positioned a discrete distance above the tank body 16 interior wall, and is located above the tank's liquid inlet/outlet port 15, forming a floor plate within the tank above the port. The nozzle member 12 is placed into its position within the tank by a number of support posts 20, which operate to elevate the nozzle member 12 a desired distance above the fluid's inlet/outlet port 15. The location, number and size of support posts 20 that are used is important as the posts 20 must be of sufficient strength to uniformly support the nozzle member 12 under the pressure of either the bladder precharge or the tank's fluid.

In a preferred embodiment, the nozzle member 12 is supported by approximately sixteen support posts 20. The distance that the nozzle member 12 sits above tank's fluid inlet/outlet port 15 is calculated to allow optimum flow rate into and out of the tank. The nozzle member 12 is connected to the support posts 20 by any means sufficient to secure the two nozzle system members together, and sufficient to withstand the force exerted upon the connection by the fluid entering or exiting the surge tank 10. In a preferred embodiment, the nozzle member 12 is attached to the support posts 20 by screws.

In the tank 10 of FIG. 1, gas is introduced into bladder 13 by way of the gas charging valve 24. The bladder 13 is filled with a predetermined volume of gas, and typically the bladder 13 is filled to 85% capacity. In a preferred embodiment, the gas is nitrogen.

FIG. 2 illustrates a top plan view of the nozzle member 12, of the high flow nozzle system of this invention, showing the sides 32 positioned at each end nozzle member, both comprising a plurality of perforations 31 disposed therethrough. The size, number and location of the perforations 31 are determined by a series of mathematical equations that are presented in detail below. The total surface area of all perforations 31 through the nozzle member 12 is desired to exceed the total surface area of the tank's inlet/outlet port 15. The exact size of the perforations 31 will vary depending upon the operating pressure of the system.

In a preferred embodiment, approximately 77% of the perforations 31 in the nozzle member 12 are located directly above the tank's fluid inlet/outlet port 15. The balance of the perforations 31 are equally spaced throughout the remaining surfaces of the nozzle member 12. Approximately 23% of the perforations 31 through the nozzle member are not directly over the tank's fluid inlet/outlet port, and therefore act to disperse and redirect the incoming fluid throughout tank 11.

The nozzle member 12 may be made from a variety of materials so long as they are chemically resistant to the liquid being pumped, and are capable of withstanding the operating pressures of the system. In a preferred embodiment, the nozzle member 12 is made of stainless steel.

FIG. 3 is a side view of the nozzle member 12 showing one of the nozzle member sides 32, and illustrating the location and position of perforations 31 therethrough. The nozzle member side 32 is configured to conform with the interior dimensions of tank 10, such that the nozzle member 12 fits with an adjacent portion of the tank body 16 interior wall.

Figure 4A:
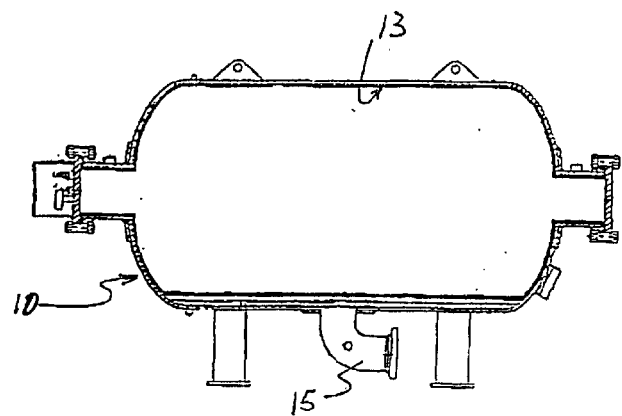
FIGS. 4A and 4B are cross-sectional side elevations of the horizontal surge tank of FIG. 1, illustrating the position of a bladder at different liquid levels within the tank (FIG.
Figure 4B:
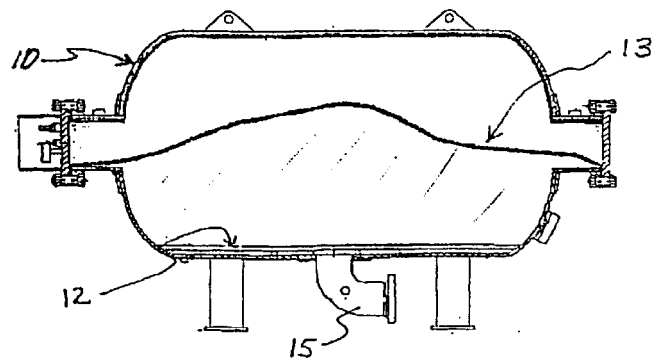

FIG. 4A illustrates the position of the bladder 13 against the interior wall surface in the horizontal bladder surge tank 11 after the bladder 13 has been charged with pressurized gas, but no liquid is in tank 11. FIG. 4B illustrates the position of the bladder 13 in the horizontal bladder surge tank 10 after the bladder 13 has been charged and after liquid has entered the tank 11. The liquid entering the tank causes the portion of the bladder above the inlet/outlet port 15 to be displaced outwardly away from a bottom portion of the tank interior wall surface, and inwardly into the tank. The position of the bladder 13 in FIG. 4B is clearly above the nozzle member 12.

Figure 4C:
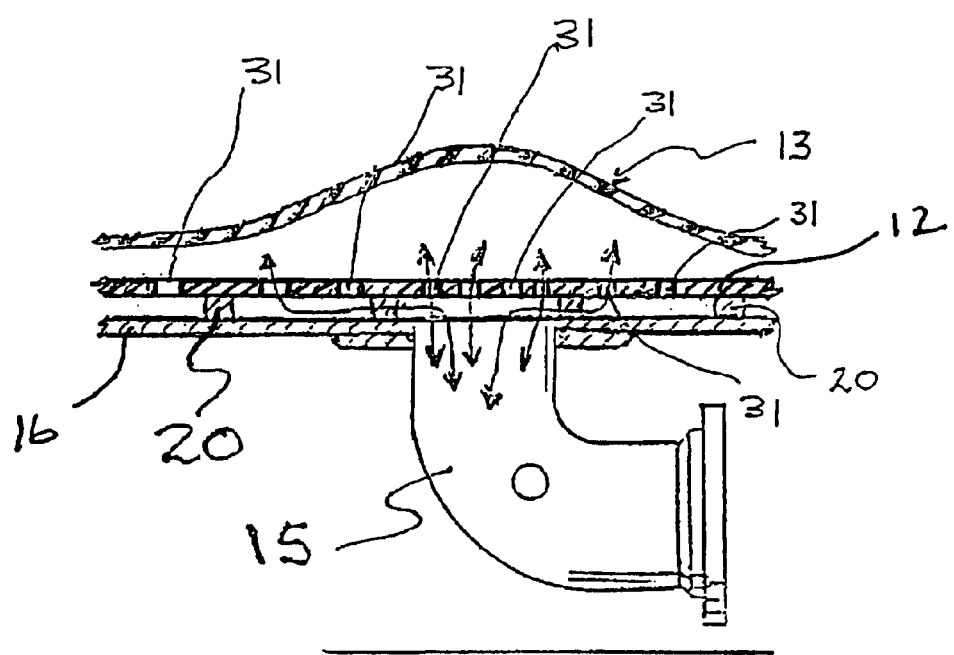
FIG. 4C is a fragmentary sectional view of the nozzle system of FIG. 1, illustrating the position of the nozzle member within the horizontal bladder surge tank and the flow of liquid through the nozzle member.

FIG. 4C is a fragmentary sectional view of the inventive nozzle member 12 of this invention 12 as it is disposed just above the tank's inlet/outlet port 15. FIG. 4C shows the location of some of the support posts 20, interposed between the tank body wall 16 and the nozzle member 12, as well as some of the nozzle member perforations 31. Dual headed arrows illustrate the flow path of the liquid as it enters and exits the tank 10 through nozzle member perforations 31.

A series of mathematical formulas are used to determine the number and placement of the perforations 31 in the nozzle member 12 as configured for use in the horizontal surge tank 10. In an example embodiment, the following mathematical formulas are used to determine the number and placement of perforations in a 500 gallon horizontal surge tank having an 8-inch diameter inlet/outlet port, and having an operating pressure of approximately 275 psi.

Horizontal Surge Tank Nozzle System Mathematical Formulas

Number of holes in nozzle member located above the inlet/outlet port=333

Approximate hole diameter=0.375 in.

Surface area of holes located above the inlet/outlet port= $333 \times \pi/4(0.375)^2 = 36.8$ in.$^2$ Number of holes around the inlet/outlet port=98

Approximate hole diameter=0.375 in.

Surface area of holes around the inlet/outlet port=$98 \times \rho/4(0.375)^2 = 10.8$ in.$^2$ Total opening area through surge tank=36.8+10.8=47.6 in.$^2$ Percentage of openings above the inlet/outlet port=36.8/47.6×100=77%

Inlet/outlet port area (8 in. Sch 80 pipe)=45.7 in.$^2$.

The total surface area of the nozzle member perforations 31 for this example application is approximately 47.6 square inches, and the total area of the tank's fluid inlet/outlet port 15 is approximately 45.7 square inches.

Figure 5:
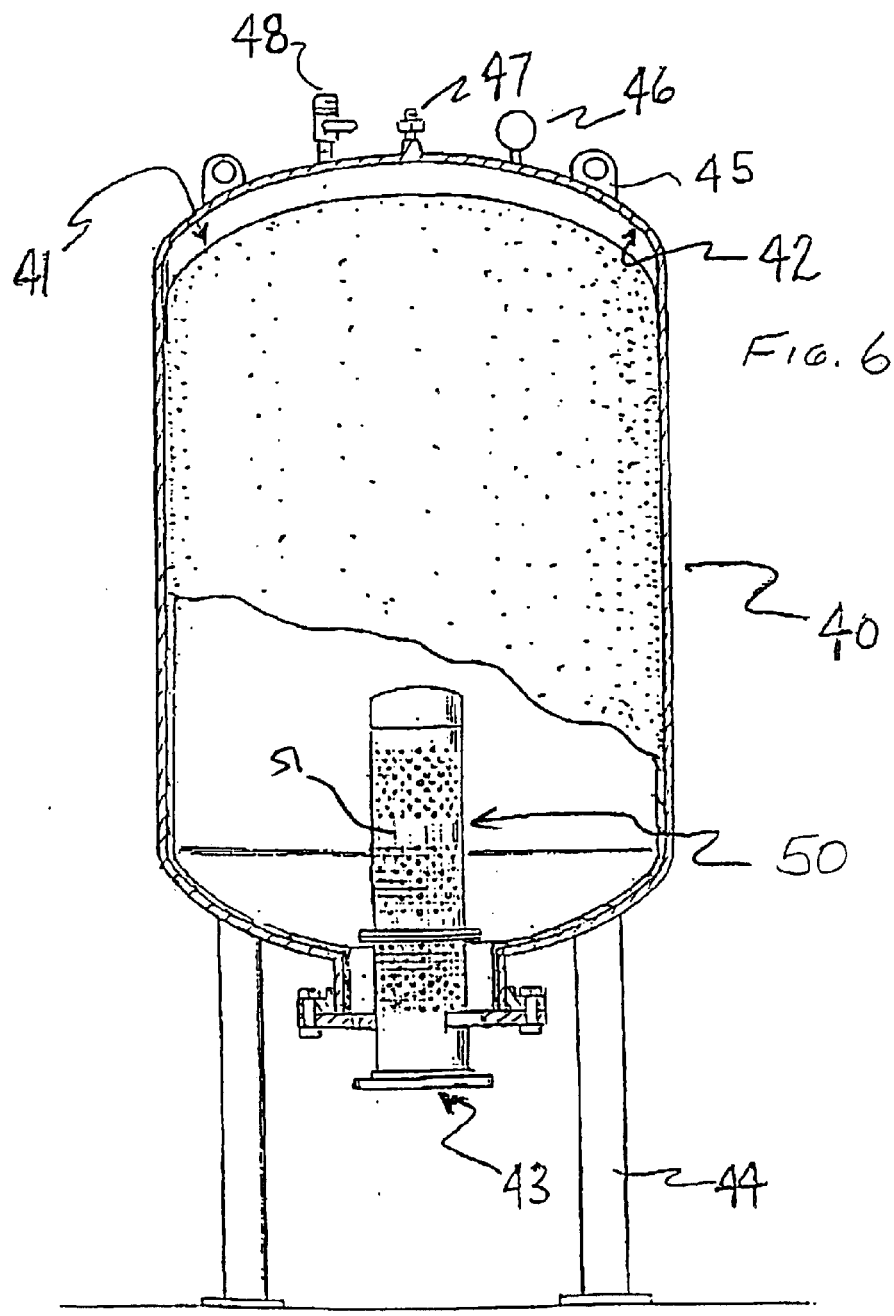
FIG. 5 is a cross-sectional side elevation of a vertical bladder surge tank comprising a high flow nozzle system of this invention.

FIG. 5 illustrates a vertical bladder surge tank 40 comprising a high flow nozzle system 50 of this invention adapted for use in the same. The vertical bladder surge tank 40 has a fluid inlet/outlet port 43 located at a base portion of the tank, which allows fluid to enter or exit the tank 40. The vertical tank's fluid inlet/outlet port 43 may vary in size depending upon tank application and system needs.

In this example embodiment, the vertical bladder surge tank 40 is a pressure vessel having a bladder 41 which rests between an interior wall 42 of the tank and the inventive nozzle system 50. Thus, unlike the nozzle system configured for use in a horizontal surge tank (where the nozzle system is disposed outside of the bladder, between a portion of the tank interior wall and the bladder), the nozzle system as adapted for use in this vertical surge tank is actually disposed within the bladder itself.

The nozzle system 50 for this vertically oriented surge tank application includes a nozzle member 51 that is provided as an integral part of the inlet/outlet port 43. Specifically, the nozzle member 51 is positioned adjacent a terminal end of the inlet/outlet port 43. The nozzle member 51 is positioned vertically above the inlet/outlet port 43 such that any fluid entering or exiting the tank through the port 43 must also pass through nozzle system nozzle member 51.

The vertical bladder surge tank 40 is supported by four legs 44, only two of which are shown. The vertical bladder surge tank 40 is also configured with lift tabs 45 that may be used to facilitate ease of placement. The vertical bladder surge tank 40 is also designed to include a pressure gauge 46, a gas valve 47, and a rupture disk 48, or other components as may be required.

The inlet/outlet port 43 is disposed through an opening at the base of the tank, and the nozzle system 50 is positioned within the tank interior chamber, and within the bladder itself. The bladder includes a flange-type attachment that is secured to the tank body by conventional means concentrically around the inlet/outlet port 53.

Vertical bladder surge tanks 40 can vary in size from about 250 gallons to more than 5000 gallons, and may be made from a variety of materials, so long as the material has sufficient strength to support the load and operating pressures and is chemically resistant to the fluid being pumped. In a preferred embodiment, the material of construction is epoxy-coated carbon steel or stainless steel.

The bladder 41 may be made from a variety of materials so long as each is suitable to contain gas under pressure as well as being resistant to attack from the liquid within the system. The bladder 41 must also be sufficiently strong enough to withstand the pressure or force exerted upon it by the incoming fluid. In a preferred embodiment, bladder 41 is made of synthetic nitrile rubber, such as buna-n.

In the vertical surge tank of FIG. 5, gas is introduced into the tank's interior cavity by way of gas charging valve 47. The bladder 41 is filled with the surge liquid, and typically the bladder 41 is filled to between about 80% to 85% capacity. In a preferred embodiment, the gas is nitrogen.

Figure 6:
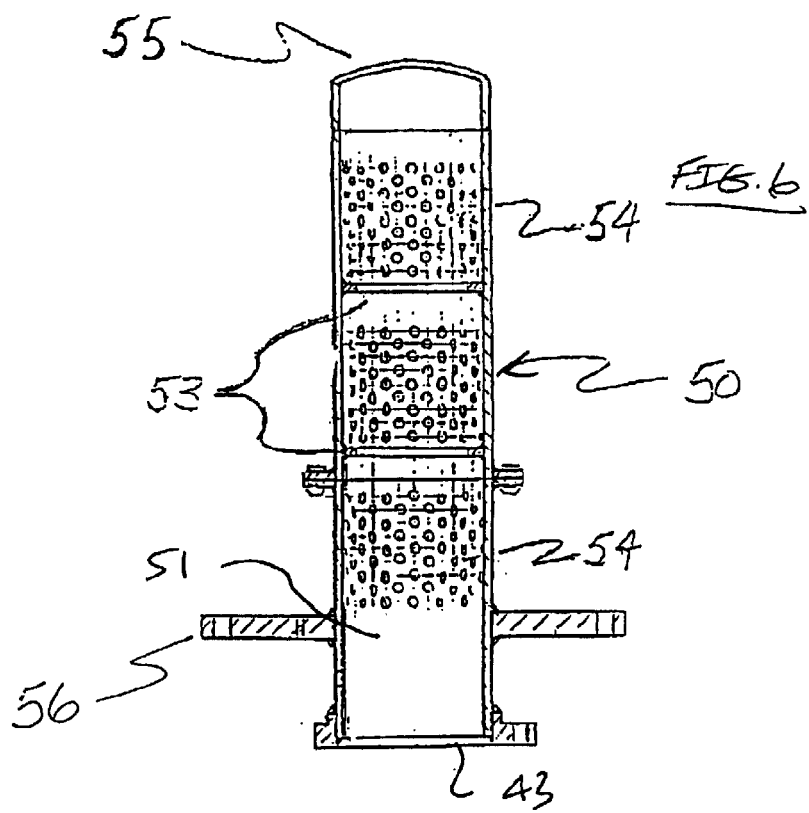
FIG. 6 is a cross-sectional side elevation of a nozzle member taken from the nozzle system of FIG. 5.

FIG. 6 is an enlarged view of the nozzle system 50 of this invention illustrating the relationship between the nozzle member 51 and the inlet/outlet port 43. The nozzle member 51 has a generally cylindrical cross section, is column shaped, and includes a plurality of perforations 54 therethrough that are located at predetermined locations. The nozzle member 51 covers the tank's inlet/out port 43, and is attached to the vertical bladder surge tank 40 by way of a flange 56 and bolts (not shown). The nozzle member 51 includes a closed and rounded end 55 opposite the tank's fluid inlet/outlet port 43 to prevent damage to bladder 41.

The nozzle member 51 includes two internal baffles 53, which are placed at predetermined locations diametrically within the nozzle member to provide a consistent pressure drop which results in a laminar flow of liquid. The location of the perforations 54 along the wall surface of the nozzle member also acts to disperse the incoming liquid uniformly over a wide area so as to minimize any damage to the bladder which could occur were the force of the incoming liquid focused upon one area of the bladder. The total area of perforations 54 preferably exceeds the total area of the tank's fluid inlet/outlet port 43. The size, number and location of perforations 54 are determined by a series of mathematical calculations better described below. The size of the perforations 54 will also vary depending upon the operating pressure of the system.

Figure 7:
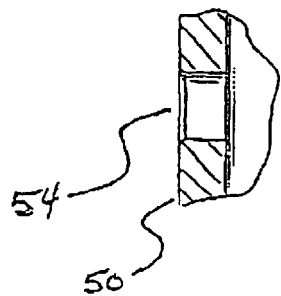
FIG. 7 is a fragmentary sectional view of one of the openings through the nozzle system nozzle member of FIGS. 5 and 6.
Figure 8:
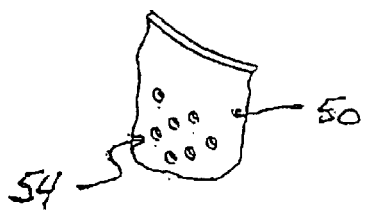
FIG. 8 is a fragmentary perspective view of the nozzle system nozzle member of FIG. 6.

FIG. 7 is a fragmentary sectional view of one of the perforations 54 of the nozzle member 51 as seen in FIGS. 5 and 6. FIG. 8 is a fragmentary perspective view of a portion of the nozzle member 51 showing the perforations 54.

A series of equations is used in calculating the number and placement of each perforation 54 in the nozzle system nozzle member 51 for use in a vertical bladder surge tank application. In an example embodiment, the following mathematical equations are used to calculate the number and placement of perforations for use within a 500 gallon vertical surge tank having an 8-inch diameter inlet/outlet opening at an operating pressure of 250 psi.

Vertical Surge Tank Nozzle System Mathematical Formulas

Three sections of holes

Nine rows in each section

Sixteen holes in each row

Number of holes in nozzle member=3 sections×9 rows× 16 holes=432

Approximate hole diameter=0.50 in.

Surface area of holes in nozzle member=432×$\pi$/4(0.50)$^2$=84.8 in.$^2$

Inlet/outlet nozzle system area (8 in. Sch 40 pipe)

ID=7.981 in.; $\pi$/4(7,981)$^2$=50.0 in$^2$

The total surface area of the perforations 54 in the vertical nozzle system nozzle member 51 is approximately 84.8 square inches; and the total surface area of the tank's fluid inlet/outlet port is approximately 50 square inches.

The above-described embodiments of the present invention are merely descriptive of its principles and are not to be considered limiting. The scope of the present invention instead shall be determined from the scope of the following claims including their equivalents.

What is claimed is:

1. A surge tank comprising:
a tank body having a cylindrical interior wall interposed between opposed body ends, the body being adapted to accommodate a volume of liquid therein;
a liquid port adjoined to the tank body and extending to the interior wall to allow liquid to enter and exit the tank body;
an elastomeric bladder positioned within the tank body, the bladder having a volume of gas disposed therein and adapted to separate a volume of liquid within the tank from the volume of gas; and
a nozzle system disposed within the tank body and positioned adjacent an end of the liquid port, the nozzle system including a nozzle member disposed a determined distance above the liquid port end and including a first set of opposed axially extending edges that are connected to the interior wall, and a second set of opposed edges that are perpendicular to the axially extending edges and that are connected to the interior wall by respective radially extending sides, having a plurality of perforations disposed therethrough for passing liquid from the liquid port into and out of the tank;
wherein the perforations define a total surface area that is greater than a total surface area of the liquid port.

2. The surge tank as recited in claim 1 wherein the nozzle member is in the form of a rectangular plate positioned horizontally along a bottom portion of the tank, and is interposed between a portion of the tank interior wall and a portion of the bladder.

3. The surge tank as recited in claim 1 wherein the bladder is configured having a enclosed body with a single opening for receiving the volume of gas.

4. The surge tank as recited in claim 1 wherein the nozzle member sides include one or more perforations disposed therethrough for passing liquid from the liquid port into and out of the tank.

5. The surge tank as recited in claim 4 wherein the perforations are distributed throughout the nozzle member such that liquid entering the tank body through the liquid port is dispersed uniformly into the tank body.

6. The surge tank as recited in claim 4 wherein a majority of the perforations through the nozzle member are positioned directly above the liquid port.

7. The surge tank as recited in claim 6 wherein approximately 77 percent of the perforations through the nozzle member are positioned directly above the liquid port.

8. A horizontal bladder surge tank comprising:
a tank body having a cylindrical interior wall interposed between opposed closed ends, the tank body being adapted to accommodate liquid therein;
a liquid port adjoined to a bottom portion of the tank body that extends to the interior wall to facilitate the transport of liquid into and out of the tank body;
a bladder disposed horizontally within the tank body and positioned adjacent to the interior wall, wherein the bladder is in the form of an enclosed member that is precharged with a volume of a pressurized gas, the bladder forming a barrier between liquid and gas within the tank body; and
a nozzle system disposed within the tank body and comprising a nozzle member having a plurality of perforations, the nozzle member being interposed between the interior wall and the bladder, and being separate from and positioned a distance above the liquid port, the nozzle member being in the form of a rectangular plate having opposed lengthwise edges joined with adjacent surfaces of the interior wall, and opposed widthwise edges that are connected with adjacent surfaces of the interior wall by respective downwardly projecting sides;
wherein liquid entering and exiting the tank body passes through the plurality of perforations in the nozzle member.

9. The horizontal bladder surge tank as recited in claim 8 wherein the perforations define a total surface area that is greater than a total surface area of the liquid port.

10. The horizontal bladder surge tank as recited in claim 8 wherein the perforations are distributed throughout the nozzle member such that liquid entering the tank body through the liquid port is dispersed uniformly therein.

11. The horizontal bladder surge tank as recited in claim 10 wherein a majority of the perforations are positioned directly above the, liquid port.

12. A vertical bladder surge tank comprising:
a tank body having a cylindrical interior wall interposed between opposed end potions, the body being adapted to retain liquid therein;
a liquid port adjoined to one of the end portions positioned along a bottom of the tank body that allows liquid to enter end exit the tank body;
a bladder disposed vertically within the tank body and positioned against the interior wall, wherein the tank is charged with a pressurized gas between the interior wall and the bladder, and wherein the bladder forms a barrier between liquid and gas within the tank body; and
a nozzle system disposed within the tank body and within the bladder, the nozzle system including a cylindrical nozzle member having a plurality of perforations disposed therethrough and being joined at one end to the liquid port, the nozzle member having a closed end opposite the liquid port so that liquid entering and exiting the tank body passes through a plurality of perforations, wherein the bladder is provided in the form of an enclosed member having a single opening positioned around the nozzle member and wherein the perforations define a total surface area that is greater than a total surface area of the liquid port.

13. The vertical bladder surge tank as recited in claim 12 wherein the perforations are distributed throughout the nozzle member such that liquid entering the tank body through the liquid port is dispersed uniformly into the bladder.

14. The vertical surge tank as recited in claim 12, the nozzle member further comprising at least two baffles disposed therein at predetermined locations.

* * * * *